United States Patent
Nakamura et al.

(10) Patent No.: US 7,237,140 B2
(45) Date of Patent: Jun. 26, 2007

(54) FAULT TOLERANT MULTI-NODE COMPUTING SYSTEM FOR PARALLEL-RUNNING A PROGRAM UNDER DIFFERENT ENVIRONMENTS

(75) Inventors: Nobutatsu Nakamura, Tokyo (JP); Ryuichi Hiraike, Tokyo (JP)

(73) Assignee: NEC Corporation, Tokyo (JP)

( * ) Notice: Subject to any disclaimer, the term of this patent is extended or adjusted under 35 U.S.C. 154(b) by 502 days.

(21) Appl. No.: 10/792,840

(22) Filed: Mar. 5, 2004

(65) Prior Publication Data

US 2004/0205377 A1  Oct. 14, 2004

(30) Foreign Application Priority Data

Mar. 28, 2003 (JP) .............................. 2003-089880

(51) Int. Cl.
*G06F 11/00* (2006.01)
(52) U.S. Cl. .......................................................... 714/4
(58) Field of Classification Search ................... 714/4, 714/10
See application file for complete search history.

(56) References Cited

U.S. PATENT DOCUMENTS

| | | | | |
|---|---|---|---|---|
| 5,440,726 | A  * | 8/1995 | Fuchs et al. .................... 714/20 |
| 5,712,971 | A | 1/1998 | Stanfill et al. |
| 5,987,622 | A  * | 11/1999 | Lo Verso et al. ................ 714/6 |
| 6,014,669 | A  * | 1/2000 | Slaughter et al. .............. 707/10 |
| 6,173,420 | B1 * | 1/2001 | Sunkara et al. ................ 714/38 |
| 6,651,183 | B1 * | 11/2003 | Gensler et al. ................. 714/4 |
| 6,693,874 | B1 * | 2/2004 | Shaffer et al. ............... 370/217 |
| 6,745,240 | B1 * | 6/2004 | Denman et al. ............. 709/220 |
| 6,785,375 | B1 * | 8/2004 | Beddus et al. ........... 379/220.01 |
| 6,816,905 | B1 * | 11/2004 | Sheets et al. ................ 709/226 |
| 6,823,356 | B1 * | 11/2004 | Novaes et al. ............... 709/201 |
| 6,966,010 | B1 * | 11/2005 | Curtis et al. .................... 714/4 |

OTHER PUBLICATIONS

Algirdas Avizienis et al., "Fault Tolerance by Design Diversity: Concepts and Experiments", Computer Society, Aug. 1984, pp. 67-80, vol. 17, No. 8, IEEE Computer Society.

* cited by examiner

*Primary Examiner*—Robert Beausoliel
*Assistant Examiner*—Amine Riad
(74) *Attorney, Agent, or Firm*—Foley & Lardner LLP

(57) ABSTRACT

In a fault tolerant computing system, a number of processing nodes are connected via a communication channel to a management node. The management node has the function of setting the processing nodes in uniquely different configurations and operating the processing nodes in parallel to execute common application programs in parallel, so that the application programs are run under diversified environments. The management node has the function of respectively distributing request messages to the processing nodes. The configurations of the processing nodes are sufficiently different from each other to produce a difference in processing result between response messages when a failure occurs in one of the processing nodes. Alternatively, the management node has the function of selecting, from many processing nodes, those processing nodes which are respectively set in uniquely different configurations and operating the selected processing nodes in parallel to execute the common application programs.

39 Claims, 8 Drawing Sheets

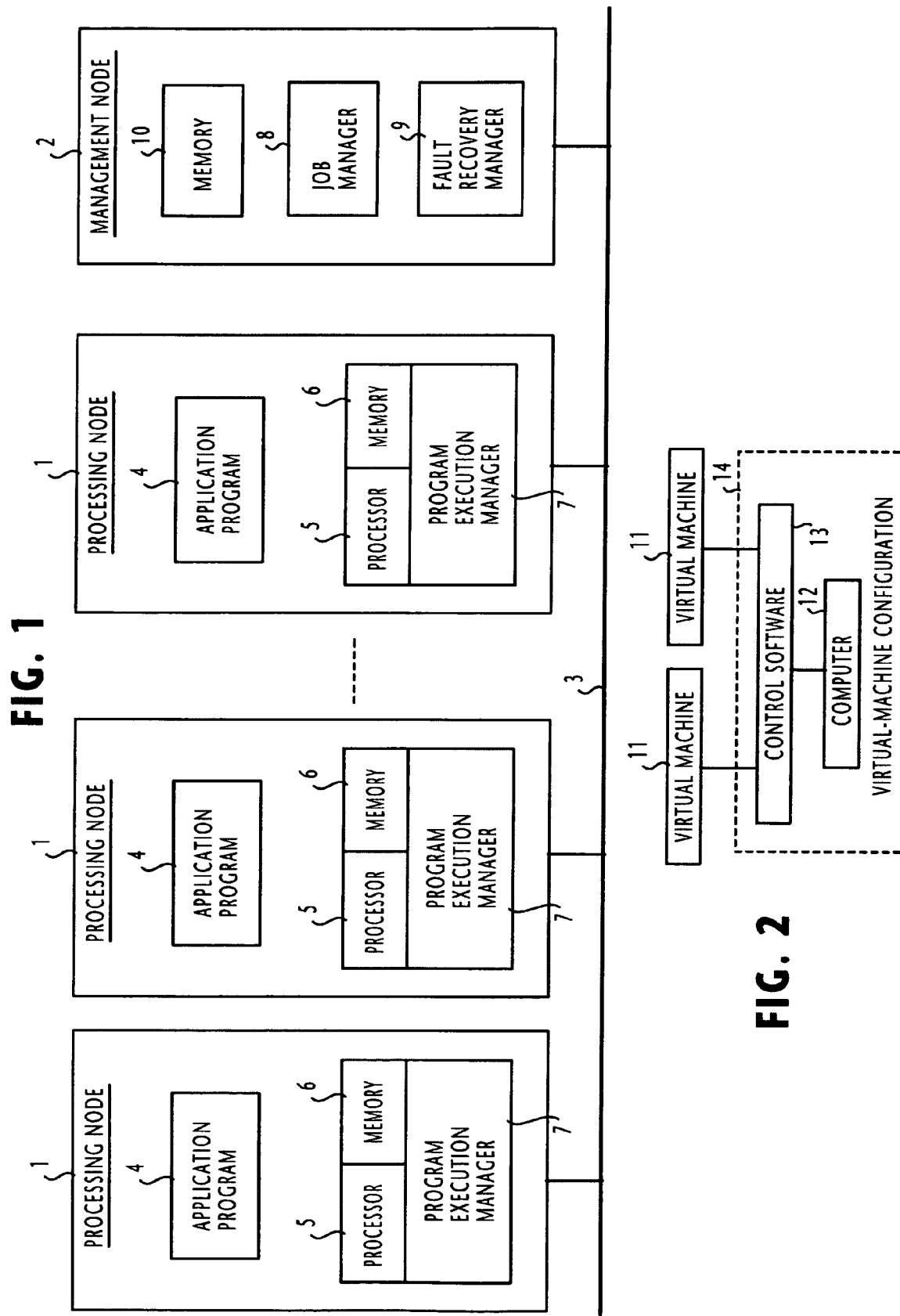

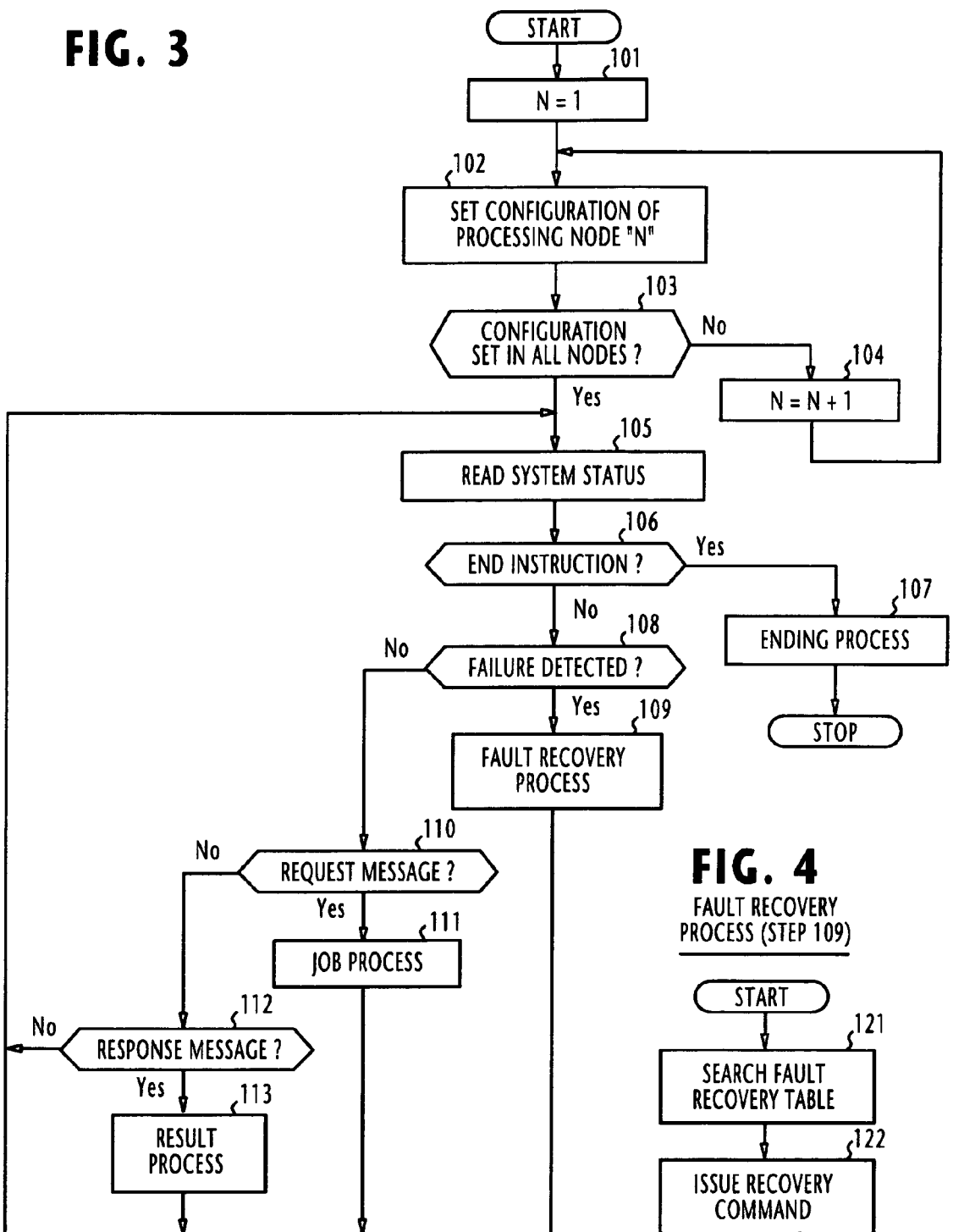

JOB PROCESS (STEP 111)

RESULT PROCESS (STEP 113)

FAULT TOLERANT MULTI-NODE COMPUTING SYSTEM FOR PARALLEL-RUNNING A PROGRAM UNDER DIFFERENT ENVIRONMENTS

BACKGROUND OF THE INVENTION

1. Field of the Invention

The present invention relates generally to a multi-node computing system and more specifically to a software-fault tolerant multi-node computing system and a method of enhancing the fault tolerance of a computing system at the level of its software element.

2. Description of the Related Art

Fault tolerant computing systems are known in the computer technology to cope with a system error. Usually, the fault tolerant computing system is one in which a plurality of identical modules are connected to a common bus. All applications are divided into a number of tasks of suitable size and each module is assigned the same tasks. All the tasks are simultaneously executed by the modules. Through the common bus, each module reads the result of the execution performed by other modules to which the same tasks are assigned and takes a majority decision for masking a system error of any of these modules. However, the presence of a software error results in a premature ending of the program known as abnormal end.

A technical paper "Fault Tolerance by Design Diversity: Concepts and Experiments" (A. Avizienis and John P. J. Kelly, IEEE Computer Society. Vol. 17, No. 8, August 1984, pages 67–80) describes a fault tolerance scheme in which a plurality of programs of identical function for achieving the same purpose are independently designed by different developers. These independently designed programs are simultaneously executed in parallel. By taking a majority decision from the results of the parallel computations, a software error in one of these programs is masked. However, the development cost of this technique is prohibitively high.

U.S. Pat. No. 5,712,971 discloses a method known as checkpointing scheme for reconstructing the state of an interrupted computation in a parallel processing system. According to this scheme, an application program is executed in distinct execution phases by issuing commands and replies. All such commands and replies are recorded and the end state of each successfully completed execution phase is saved in memory. If a failure is detected in any of such execution phases, the last-saved end state of the execution phase prior to the detection of the failure is restored and all recorded commands and replies from the beginning of execution of the application up through the restored last-saved end state are recapitulated.

U.S. Pat. No. 5,440,726 discloses a fault recovery technique which performs management of checkpointing data. When a failure is detected, the checkpointing data is retried item by item in search of the best checkpointing data.

Also known in the computing art is the method of making regular backup copies of data of the hard-disk onto a separate storage medium. The checkpointing scheme differs from the backup method in that it additionally saves dynamic data such as the internal variables and the running point of execution. To ensure precision checkpointing, it is necessary to prevent the system from saving an internal variable which is currently changing and to cause the system to save the running point of execution.

Another shortcoming of the prior art checkpointing scheme is that, since a significant amount of time lapses from the instant the cause of a failure occurs to the instant the failure is detected, difficulty arises to determine which part of the saved checkpointing data is to be restored. For identifying the potential cause of a trouble, the usual practice involves system engineers making a search through the logs delivered from the computer and through the data indicating the running state of a program dumped at the instant the failure is detected. Appropriate checkpointing data is then selected based on the determined cause to recover the system from the failure. Since this approach is a time consuming job, a substantial amount of man-hours would be required.

Therefore, there exists a need for a fault tolerant computing system of enhanced tolerance to software errors.

SUMMARY OF THE INVENTION

It is therefore an object of the present invention to provide a configuration diversity fault-tolerant computing system in which a common application program is run in parallel by multiple processing nodes in respectively diversified environments.

Another object of the present invention is to provide a multi-node computing system of high software fault tolerance.

A further object of the present invention is to provide a fault tolerant computing system which prevents the occurrence of a subsequent failure immediately following the occurrence of an initial failure.

According to a first aspect of the present invention, there is provided a fault tolerant computing system comprising a plurality of processing nodes, the processing nodes respectively having uniquely different configurations for parallel-running a common application program so that the application program is run by the processing nodes under respectively diversified environments which are sufficiently different from each other that software faults are not simultaneously activated by the processing nodes. Specifically, each of the configurations comprises hardware configuration, software configuration, external device configuration and program startup configuration.

According to a second aspect, the present invention provides a fault tolerant computing system comprising a plurality of processing nodes interconnected by a communication channel, each of the processing nodes having an identical application program, control means for respectively setting the processing nodes in uniquely different configurations and operating the processing nodes in parallel to execute the application program in diversified environments corresponding to the uniquely different configurations, and distributing means for distributing request messages respectively to the processing nodes, so that the request messages are individually processed by the application programs to produce a plurality of response messages. The configurations of the processing nodes are sufficiently different from each other that software faults are not simultaneously activated by the processing nodes.

Alternatively, the control means selects, from many processing nodes, a plurality of processing nodes which are respectively set in uniquely different configurations and operating the selected processing nodes in parallel to execute the application programs in diversified environments corresponding to the uniquely different configurations.

According to a third aspect, the present invention provides a method of operating a computing system, wherein the computing system comprises a plurality of processing nodes interconnected by a communication channel, each of the processing nodes having an identical application program, the method comprising the steps of respectively setting the processing nodes in uniquely different configurations which are sufficiently different from each other that software faults are not simultaneously activated by the processing nodes, operating the processing nodes in parallel to execute the application programs in environments corresponding to the uniquely different configurations, and respectively distributing request messages to the processing nodes, so that the request messages are individually processed by the application programs to produce a plurality of response messages.

Alternatively, the method provides selecting, from many processing nodes, those processing nodes respectively set in uniquely different configurations which are sufficiently different from each other that software faults are not simultaneously activated by the selected processing nodes.

BRIEF DESCRIPTION OF THE DRAWINGS

The present invention will be described in detail further with reference to the following drawings, in which:

FIG. 1 is a block diagram of a computing system according to a first embodiment of the present invention;

FIG. 2 is a block diagram of processing nodes implemented with virtual machines;

FIG. 3 is a flowchart of the operation of the computing system of FIG. 1;

FIG. 4 is a flowchart illustrating details of the fault recovery procedure of FIG. 3;

DETAILED DESCRIPTION

Figure 5:
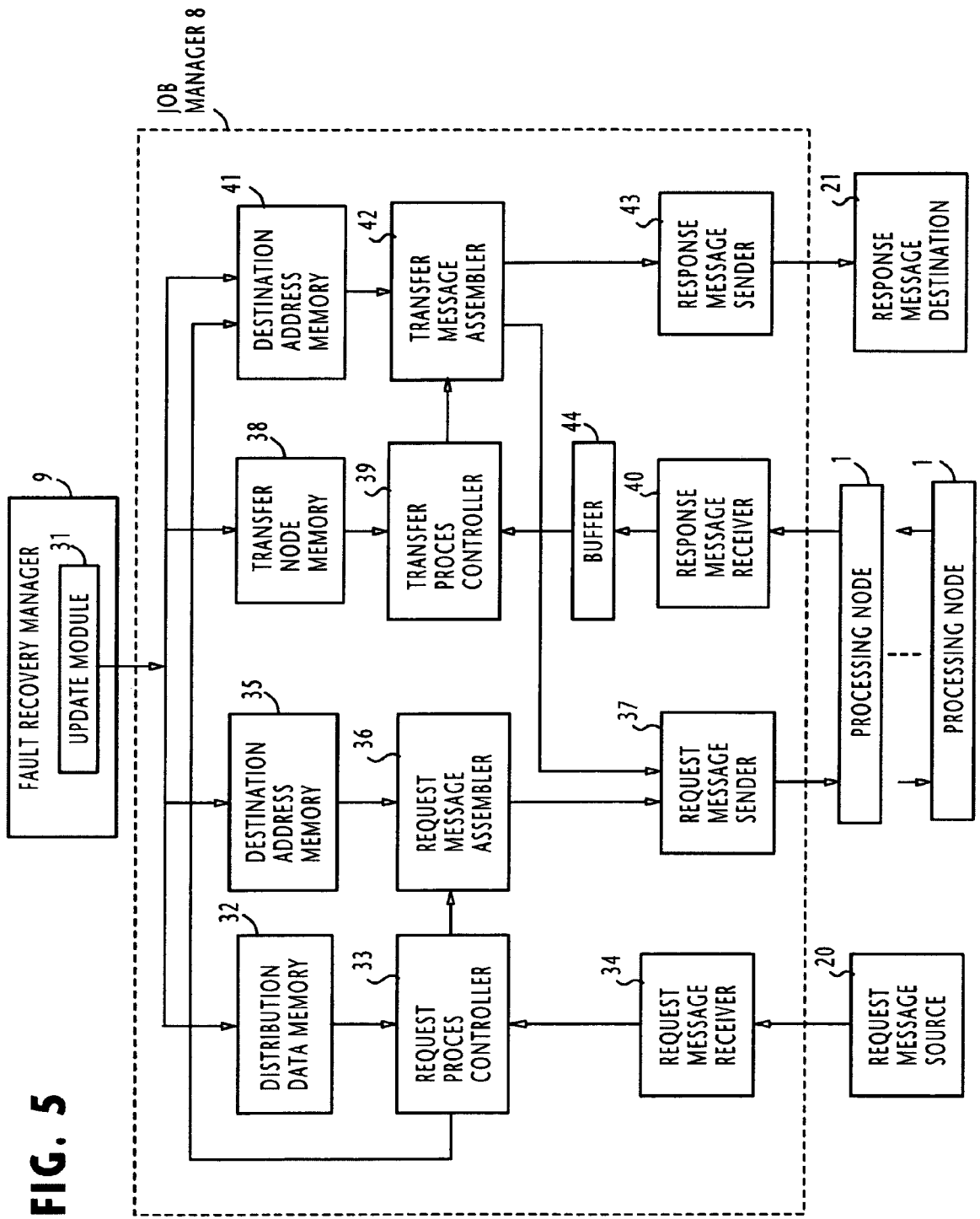
FIG. 5 is a block diagram of the management node.

Referring to FIG. 1, there is shown a fault tolerant computing system according to a first embodiment of the present invention. The computing system comprises a plurality of processing nodes 1 and a management node 2. All processing nodes 1 and the management node 2 are connected to a common communication channel 3. Each of the processing nodes 1 comprises a processor 5, a memory 6, and a computer program 4 which is run in parallel with the programs 4 of other processing nodes. Each processing node is further provided with a program execution manager 7 whose functions include the setting of the configuration of the program of its own node, reading the program 4 into the memory 6 and running the program, and performing transmission and reception of data with the other processing nodes via the communication medium 3, which may be a serial or parallel bus, LAN or wireless LAN, the Internet or a public switched network, or a combination of theses. Program 4 is an application program which receives a job request message from the management node 2, and processes the request and returns a response message to the management node 2. Application programs 4 are run in parallel by the processing nodes 1.

Management node 2 is comprised of a memory 10 for storing configuration data for respectively setting the processing nodes 1 in uniquely different configurations and the running state (i.e., snapshot image/ data) of the application program of each processing node 1 (such as checkpointing data). A job manager 8 is provided in the management node for performing the management of the running states of the simultaneously executed programs 4 of all processing nodes 1 and the management of jobs on the basis of the operating status of the system. Further included is a fault recovery manager 9 which monitors the system for detecting a failure and performs a fault recovery procedure when a failure is detected.

Each of the processing nodes 1 and the management node 2 may be implemented with a physical machine such as a personal computer or a cell of a main-frame computer, or a virtual machine, or a combination of physical and virtual machines.

FIG. 2 shows a number of virtual machines 11 implemented on a virtual machine configuration 14 which is comprised of a physical computer 12 and a control program 13 called a virtual machine monitor. The logical operation of each virtual machine is exactly the same as the physical machine. Each virtual machine 11 may be configured independently. The processor and memory provided in each of the virtual machines 11 are called virtual resources. The basic function of control program 13 of each virtual machine 11 includes the mapping of the virtual resources of the virtual machine to the physical resources of the computer 12.

Being implemented by software, a virtual machine can be instantly created or perished, whenever necessary. If the processing nodes 1 are implemented by virtual machines to realize a wide variety of computing configurations, it is not necessary to provide many hardware modules as permanent installations, and hence a significant cost reduction can be achieved. Further, due to its software nature, the virtual machine facilitates the modification of its various operating parameters (such as the size of its main memory) and allows the implementation of a wide range of desired computing configurations.

According to the present invention, a uniquely different node configuration is set in each of the processing nodes 1. Under mutually different configurations, each processing node runs a common program in parallel with other processing nodes.

The node configuration is classified into four categories. These are (1) hardware configuration, (2) software configuration, (3) external device configuration, and (4) program startup configuration. It at least one of these categories of a processing node 1 is different from those of other processing nodes, the processing node is said to operate in a uniquely different configuration.

The hardware configuration includes main memory size, virtual memory size, memory access timing, processor operating speed, bus transmission speed, bus width, number of processors, read cache memory size, write cache memory size, cache's valid/invalid status, and types of processors and memories. In this specification, the term "hardware configuration parameter" is defined to specify a particular hardware configuration. If at least one of these hardware configuration parameters of a given processing node is different from those of other processing nodes, the given processing node is said to operate in a uniquely different hardware configuration.

The software configuration includes Operating Systems, basic software, various device drivers, and various library versions. The basic software includes the normally executed software packages which significantly affects the operation of the computer program, such as the Internet browser, firewalls, and virus checkers. The device drivers include a disk driver and the libraries include a dynamic link library. The software configuration further includes the use/nonuse of modifying patches and security patches, and the setting of configuration files, such as registry, security policy and access policy, that specify the operation of the OS, the basic software and the libraries. In this specification, the term "software configuration parameter" is defined to specify a particular software configuration. If at least one of these software configuration parameters of a given processing node is different from those of other processing nodes, the given processing node is said to operate in a uniquely different software configuration.

The external device configuration includes the types of external devices connected to a computer, such as the external disk drive, the display unit, the input/output device, and the communication device or interface. Serial ports, displays, hard disks, networks, keyboards, pointing devices, tablets, printers and loudspeakers constitute different external device configurations. In this specification, the term "external device configuration parameter" is used to specify a particular external device configuration. If at least one of these external device configuration parameters of a given processing node is different from those of other processing nodes, the given processing node is said to operate in a uniquely different external device configuration.

The program startup configuration includes different methods of starting an application program, such as (a) interruption and reboot of an application program by suspending the CPU while holding the contents of the main memory (known as Suspend-to-RAM), (b) interruption and reboot of an application program by saving the contents of the main and virtual memories on a hard disk, suspending the OS and restoring the saved memory contents when the OS is restarted (known as Suspend-to-Disk), (c) interruption and reboot of an application program by suspending and restarting the OS, (d) interruption and reboot of an application program by forcibly interrupting and restarting the program and the OS, (e) restarting of a computer program and the OS after reinstalling the program and the OS, and (f) restarting the application program and the OS after performing a clear install of the program and the OS. In this specification, the term "program startup configuration parameter" is defined to specify a particular startup configuration of an application program. Checkpointing data can also be used as a program startup configuration parameter. This parameter indicates which checkpointing data to use when restarting the program. In addition, passwords can be used as a program startup configuration parameter to uniquely specify the starting condition of each processing node 1. For example, some processing node would be started simultaneously with the starting of the computing system and some other node would be started when another node is interrupted or started in response to a heavy load notification. If at least one of these program startup configuration parameters of a given processing node is different from those of other processing nodes, the given processing node is said to operate in a uniquely different program startup configuration.

Storage device 10 of management node 2 includes a configuration definition area in which data is stored for uniquely setting the configuration of each processing node 1.

Program execution manager 7 of each processing node 1 receives the configuration parameters of its own node from the job manager 8 of management node 2 to establish its own configurations and runs its own computer program 4 in parallel with other processing nodes 1.

In order to prevent each processing node 1 from activating a particular bug in its program 4 under a particular running state simultaneously with the other processing nodes 1, it is preferable that the difference between the configurations of any two processing nodes be as large as possible. If the main memory sizes of any two processing nodes differ by several tens of bytes at best while the other configuration parameters are of equal value, such a difference is too small to prevent the processing nodes from concurrently activating their program bugs. Therefore, the configuration parameters of any two of the processing nodes 1 are set to differ from each other by more than a predetermined value.

If the degree of difference in node configuration between any two processing nodes X and Y is denoted as $D_{XY}$, the following relation can be established:

$$D_{XY} = aD_H + bD_S + cD_G + dD_K \quad (1)$$

where, $D_H$ represents the degree of difference in hardware configuration between the nodes X and Y, $D_S$ representing the degree of difference in software configuration between the nodes X and Y, $D_G$ representing the degree of difference in external device configuration between the nodes X and Y, and $D_K$ representing the degree of difference in program startup configuration between the nodes X and Y, and a, b, c, d are weighting variables. If the weighting variables a, b, c, d are of equal value, fairness could be guaranteed for the respective configurations, and if a greater value is used for the weighting variable of a given configuration, the degree of difference of the given configuration could be emphasized. These weighting variables are determined by experiments and analysis of computer resource usage.

The degree of difference in hardware configuration $D_H$ between nodes X and Y is given by:

$$D_H = h_1|D_{HX1} - D_{HY1}| + h_2|D_{HX2} - D_{HY2}| + \ldots + h_r|D_{HXr} - D_{HYr}| \quad (2)$$

where, $D_{HXi}$ (i =1, 2, . . . , r) is the i-th parameter of the hardware configuration of node X, $D_{HYi}$ is the i-th parameter of the hardware configuration of node Y, and $|D_{HXi} - D_{HYi}|$ is the degree of difference in the i-th hardware configuration parameter between nodes X and Y. For example, the degree of difference in the i-th hardware configuration (e.g. memory 6) parameter may be determined as "0" (i.e., there is no substantial difference) if the memories 6 of nodes X and Y differ in size by less than multiple 2, as "1" if they differ by a multiple in the range between 2 and 4, and as "2" if they differ by a multiple in the range between 4 and 8. In the case of processors 5, the degree of difference may be determined as "0" if the types and the version numbers of processors 5 are equal to each other, as "1" if the types of their processor are equal but their version numbers are different, and as "2" if the types of their processor are different. In the cache's valid/invalid status parameter where only two values can be taken, the degree of difference may be determined as "0" if the nodes X and Y assume the same cache state, and as "1" if they assume different cache states. $h_i$(i=1, 2, . . . , r) is a weighting variable. If the weighting variables hi are of equal value, fairness could be guaranteed for the respective hardware configuration parameters, and if a greater value is used for the weighting variable of a given hardware configuration parameter, the degree of difference of the given parameter could be emphasized. These weighting variables are determined by experiments and analysis of computer resource usage.

The degree of difference in software configuration $D_S$ between nodes X and Y is given by:

$$D_S = s_1|D_{SX1}-D_{SY1}| + s_2|D_{SX2}-D_{SY2}| + \ldots + s_s|D_{SXs}-D_{SYs}| \quad (3)$$

where, $D_{SXi}$ (i=1, 2, . . . , s) is the i-th parameter of the software configuration of node X, $D_{SYi}$ is the i-th parameter of the software configuration of node Y, and $|D_{SXi}-D_{SYi}|$ is the degree of difference in the i-th software configuration parameter between nodes X and Y. For example, the degree of difference in the Operating System of nodes X and Y may be determined as "0" if their operating systems are equal in both type and version number, as "1" if they are equal in type but differ in version number, and as "2" if they differ in type. In the case of virus checkers, the degree of difference may be determined as "0" if virus checkers are used by both nodes X and Y and their version numbers are equal to each other, as "1" if their programs are equal but their version numbers are different, as "2" if their programs differ from each other, and as "3" if node X uses a virus checker but node Y does not. $s_i$ (i=1, 2, . . . , s) is a weighting variable. If the weighting variables $s_i$ are of equal value, fairness could be guaranteed for the respective software configuration parameters, and if a greater value is used for the weighting variable of a given software configuration parameter, the degree of difference of the given parameter could be emphasized. These weighting variables are determined by experiments and analysis of computer resource usage.

The degree of difference in external device configuration $D_G$ between nodes X and Y is given by:

$$D_G = g_1 51\ D_{GX1}-D_{GY1}| + g_2|D_{GX2}-D_{GY2}| + \ldots + g_t|D_{GXt}-D_{GYt}| \quad (4)$$

where, $D_{GXi}$ (i=1, 2, . . . , t) is the i-th parameter of the external device configuration of node X, $D_{GYi}$ is the i-th parameter of the external device configuration of node Y, and $|D_{GXi}-D_{GYi}|$ is the degree of difference in the i-th external device configuration parameter between nodes X and Y. For example, the degree of difference in the hard disk parameter may be determined as "0" (i.e., there is no substantial difference) if the hard disks of nodes X and Y differ in size by less than multiple 2, as "1" if they differ by a multiple in the range between 2 and 4, and as "2" if they differ by a multiple in the range between 4 and 8. In the case of printers, the degree of difference in the printer parameter may be determined as "0" if nodes X and Y are both provided with a printer and their printers are of the same type, as "1" if they are provided with a printer but their types and specifications are different, and as "2" if node X uses a printer but node Y does not. $g_i$ (i=1, 2, . . . , t) is a weighting variable. If the weighting variables $g_i$ are of equal value, fairness could be guaranteed for the respective external device configuration parameters, and if a greater value is used for the weighting variable of a given external device configuration parameter, the degree of difference of the given parameter could be emphasized. These weighting variables are determined by experiments and analysis of computer resource usage.

The degree of difference in external device configuration $D_K$ between nodes X and Y is given by:

$$D_K = k_1|D_{KX1}-D_{KY1}| + k_2|D_{KX2}-D_{KY2}| + \ldots + k_u|D_{KXu}-D_{KYu}| \quad (5)$$

where, $D_{KXi}$ (i=1, 2, . . . , u) is the i-th parameter of the program startup configuration of node X, $D_{KYi}$ is the i-th parameter of the external device configuration of node Y, and $|D_{KXi}-D_{KYi}|$ is the degree of difference in the i-th program startup configuration parameter between nodes X and Y. For example, the degree of difference in the i-th program boot parameter may be determined as "0" if the nodes X and Y use the same program startup method and as "1" if their methods are different. $k_i$ (i=1, 2, . . . , u) is a weighting variable. If the weighting variables $k_i$ are of equal value, fairness could be guaranteed for the respective program startup configuration parameters, and if a greater value is used for the weighting variable of a given program startup configuration parameter, the degree of difference of the given parameter could be emphasized. These weighting variables are determined by experiments and analysis of computer resource usage.

In order to operate a computing system having at least two processing nodes which differ only in memory size by several tens of bytes at best, the degree of difference $D_{XY}$ as given by Equation (1) must be greater than a predetermined threshold. By setting the threshold at an appropriate high value, the processing nodes 1 have a low probability of concurrently activating bugs in their computer programs 4.

FIG. 3 is a flowchart of the operation of the management node 2.

When the system is started, the management node 2 initializes a node-identifying variable N to 1 at step 101, and proceeds to step 102 to establish configuration parameters in the processing node N. Management node 2 repeats step 102 until configuration parameters are established in all the processing nodes (step 103). Otherwise, the variable N is incremented by 1 at step 104 and flow returns to step 102.

When configuration parameters are established in all the processing nodes, the computing system is now ready to operate in parallel and the management node 2 proceeds from step 103 to step 105.

At step 105, the management node 2 reads system status information to determine whether an end instruction of the computing system is issued or whether a fault is detected. Further, the management node 2 instructs all processing nodes 1 to collect its checkpointing data in a manner known in the art and send it via the program execution manager 7 and the communication channel 3 to the management node 2. Memory 10 is divided into a plurality of running status storage areas respectively corresponding to the processing nodes 1. On receiving the checkpointing data from each processing node, the job manager 8 stores it in the running status storage area of the processing node.

If an end instruction is issued, the management node 2 makes an affirmative decision at step 106 and performs a termination process (step 107) so that all the processing nodes end their process. Otherwise, flow proceeds to step 108.

If a fault is detected, the management node 2 makes an affirmative decision (step 108) and instructs the fault recovery manager 9 to perform a fault recovery process (step 109). Management node 2 now returns from step 109 to step 105 to read the system status information to determine whether a job request instruction is issued or whether the job request process has been terminated. If a job request is issued, the management node 2 makes an affirmative decision at step 110 and instructs all the processing nodes 1 to run their program 4 to process the job request in parallel (step 111) and returns to step 105. If the job request is processed (step 112), the management node 2 proceeds to step 113 to process the results individually obtained by the processing nodes to obtain an output result of the computing system, and returns to step 105 again.

The following is a detailed description of FIG. 3.

(1) Setting of Configuration Data (steps 101 to 104) When the variable N is set to 1 (step 101), the job manager 8 collaborates with the program execution manager 7 of the #1 processing node to uniquely establish the configuration of this processing node (step 102) as described in detail below and increments the variable N by one (step 104) and repeats the same process on the #2 processing node. Job manager 8 continues this process until configurations are uniquely established in all the processing nodes.

(a) If the processing node is a real machine, the job manager 8 sends a power-on signal to one of the processing nodes 1 which is specified by the variable N. In response, the program execution manager 7 of the specified node sends an enquiry message to the job manager 8 requesting its node configuration data. In response to the enquiry message, the job manager 8 reads the node configuration data of the requesting node from the memory 10 and sends it to the requesting node. Program execution manager 7 of the requesting node uses the received data to establish its own node configuration. Specifically, if the processing node is a personal computer, the program execution manager 7 saves the received configuration data in its BIOS (basic input/ output system) and reboots the personal computer. When the personal computer is restarted, the program execution manager 7 operates its application program 4. Due to the diversified configurations of all processing nodes, all application programs 4 are concurrently run under respectively different environments.

(b) If the processing node is a virtual machine, the job manager 8 specifies a file in a real machine that implements the virtual machine. Job manager 8 reads the node configuration data of the virtual machine from the memory 10 and updates the specified file with this configuration data and starts up the virtual machine. When the virtual machine is activated, the program execution manager 7 of the virtual machine starts executing its program 4.

(c) Alternatively, a plurality of processing nodes of either real or virtual machine may be provided. In this case, the job manager 8 selects those processing nodes whose node configurations are uniquely different from each other. If the selected processing node is a real machine, the job manager 8 sends a power-on signal to the selected real machine. If the selected node is a virtual machine, the job manager 8 sends an instruction to the selected virtual machine to start its process.

(2) Termination of the Computing System (steps 105 to 107)

When an end instruction of the whole system is issued as an event trigger from a manual input of the system operator or from a timer, the management node 2 informs each processing node 1 of this event by issuing a control command from the job manager 8 according to the configuration data of each processing node stored in the memory 10. As a result, some processing node may shut it down by performing a checkpointing process and copying the checkpointing data onto a magnetic tape, and some processing node may turn off its uninterrupted power source, and another processing node may perform a Suspend-To-RAM, (i.e., the processing node stops executing its program while holding its main (virtual) memory).

(3) Fault Recovery Process (steps 105 to 109)

A number of known fault recovery methods are available. If the known ping-pong method of ICMC protocol is used to monitor the operation of each processing node, the fault recovery manager 9 transmits a "ping" signal at periodic intervals over the communication channel 3 and each processing node responds with a "pong" signal which indicates the status of the processing node. When a failure occurs, the pong signal is represented by a code indicating the type of the failure.

If a failure is detected, a fault recovery process is performed by the fault recovery manager 9 at step 109. Details of the fault recovery process are shown in FIG. 4. Fault recovery manager 9 includes a mapping table, not shown, in which different types of failure (fault codes) are mapped to corresponding recovery methods (command codes).

When the fault recovery manager 9 detects a failure in a processing node, it makes a search through this mapping table using the fault code for detecting a corresponding recovery method to be performed (step 121). Fault recovery manager 9 sends the command code of the detected recovery method to the failed processing node (step 122). At step 123, the fault recovery manager 9 saves a failure log of the faulty node in the memory 10 (step 123). The failure log indicates whether a fault recovery method is being performed on the failed processing node or has been performed previously. If a failure occurs in a processing node, the failure log is used as a history of failures in the processing node for determining a method for recovering from the failure. In response to the command code, the faulty node performs the command to recover from the failure (step 124).

Assume that a failure code "0101" is used to indicate a failure event (i.e., no pong signal is returned from a given processing node within a predetermined interval following the transmission of a ping signal), and a restart command code is mapped to this failure code in the mapping table. In this case, the fault recovery manager 9 issues a restart command to the faulty node. If the faulty processing node is restarted under the same configuration, it is highly likely that the same failure will occur again. Therefore, the fault recovery manager 9 alters the configuration of the processing node with a different configuration data stored in the memory 10 before restarting the node. The alteration of the configuration of a processing node can be performed in the same manner as described in connection with step 102 (FIG. 3). Alternatively, the running state (i.e., priority of process or input/ output) of the application program 4 of a troubled processing node may be altered before rebooting its program.

If the checkpointing method is used in a fault recovery process, the fault recovery manager 9 reads checkpointing data from the memory 10 and forwards the data onto the communication channel 3. In the processing node where its application program 4 is interrupted, the program execution manager 7 receives the transmitted checkpointing data and restores data using the received data and attempts to recover from failure by restarting its application program. In this case, the interruption and the reboot of the application program 4 of a processing node are performed according to the program startup configuration established by the configuration data of the processing node as previously described.

If more than one processing node fails and the checkpointing method is used for recovering from the concurrent failures, the fault recovery manager 9 reads checkpointing data of these processing nodes from the memory 10 and instructs them to concurrently re-run their application program 4 from mutually different checkpointing data, records the checkpoint data used in this attempt in the failure log, and analyzes the failure log to determine which checkpoint data is the best to recover from the concurrent failures. In this way, the system can be quickly recovered from concurrent failures.

(4) Job Request and Response Processes (steps 105, 111, 113)

FIG. 5 shows details of a part of the job manager 8 which performs the job request and job termination processes. Job manager 8 comprises a distribution data memory 32 for storing load balancing (distribution criteria) information for distributing request messages among the processing nodes depending on their different request sources (for example, the stored information is the address of a particular machine or a lightly loaded machine for a particular request source and an indication that request messages from a particular source be rejected), a request process controller 33, a request message receiver 34, a destination address memory 35 for storing address data of destination processing nodes, a request message assembler 36, a request message sender 37, a transfer node memory 38, a transfer process controller 39, an inbound transfer message receiver 40, a destination address memory 41 for storing destinations of transfer messages, an outbound transfer message assembler 42, a transfer message sender 43 and a buffer 44 for storing the received transfer messages.

Distribution data memory 32 and the destination address memory 35 are connected to the fault recovery manager 9. Message distribution criteria is stored 9 and identifiers of message destination processing nodes. The contents of both memories 32 and 35 are updated by an update module 31 of the fault recovery manager 9 according to the operating status of the system. Transfer node memory 38 is connected to the fault recovery manager 9 to store the types of processing nodes and the number of available processing nodes for processing external request messages arriving from an external source or database. The contents of the transfer node memory 38 are updated according to the operating status of the system by the update module 31. Destination address memory 41 is also connected to the update module 31 to store the addresses of processing nodes currently available.

Figure 6:
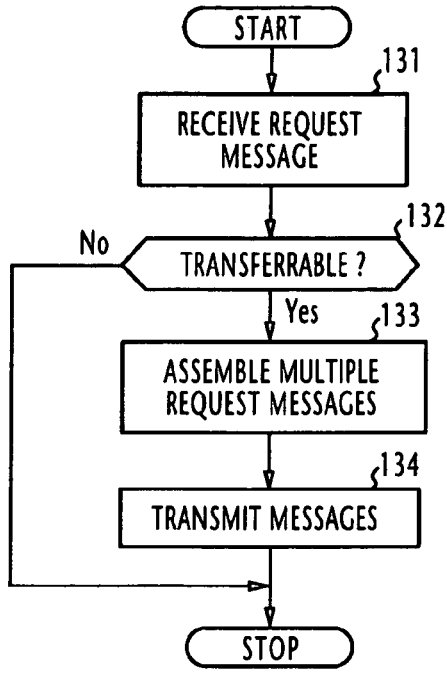
FIG. 6 is a flowchart of the operation of the management node when the request process of FIG. 3 is executed.
Figure 7:
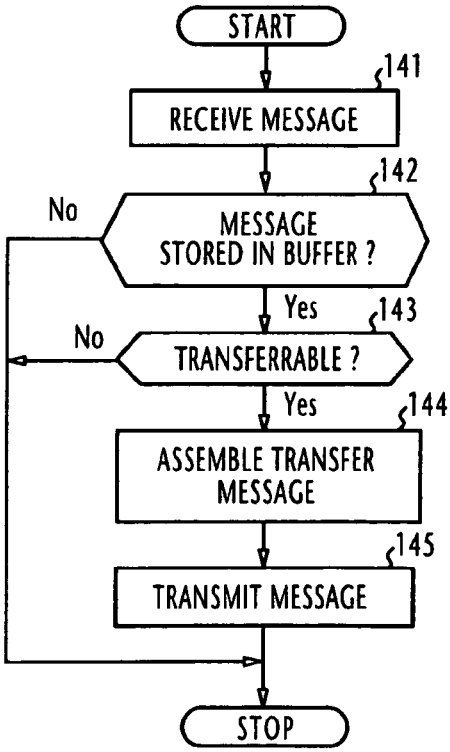
FIG. 7 is a flowchart of the operation of the management node when the response process of FIG. 3 is executed.

The operation of the job manager 8 proceeds according to the flowcharts of FIGS. 6 and 7.

When the request process controller 33 receives a request message from a message source 20 via the receiver 34 (step 131, FIG. 6), it looks up the distribution data memory 32 and makes a decision as to whether or not the request message can be transferred to a processing node (step 132). If the decision is negative, the request process controller 33 returns a reject message to the message source 20. If the decision is affirmative, the request process controller 33 stores the address of the message source 20 in the destination address memory 41 and supplies the received request message to the request message assembler 36. At step 133, the request message assembler 36 assembles multiple request messages with addresses data supplied from the destination address memory 35 so that they are destined to respective processing nodes. The request messages assembled by the request message assembler 36 are forwarded onto the communication channel from the request message sender 37 and transmitted to the destination processing nodes (step 134).

On receiving the request message, the program execution manager 7 of each destination processing node instructs its application program 4 to process the received message and transmits a response message to the communication channel 3. If a given response message is not the final result of the job processing, this message will be destined to and processed by another processing node which may be part of the same computing system or part of other computing system. For each request message, final response messages destined to the management node 2 are produced in parallel from the processing nodes and transmitted to the communication channel.

The transfer message receiver 40 thus receives the final response messages from the processing nodes 1. In addition to the final response messages, the transfer message receiver 40 receives "external request messages" which arrive from an external system via the communication channel. Therefore, a number of such "transfer" messages sequentially occur on the communication channel. In order to treat the arriving messages differently depending on their type, they are stored in the buffer 44 (step 141, FIG. 7). Transfer process controller 39 checks the buffer 44 to see if there is at least one response message (step 142). If no message is stored in the buffer 44, the transfer process controller 39 terminates the routine. Otherwise, the transfer process controller 39 reads a stored message out of the buffer 44 and looks up the transfer node memory 38.

If an external request message is stored in the buffer, the controller 39 looks up the transfer node memory 38 and determines if there is at least one processing node currently available for processing this message (step 143). If this is the case, the transfer process controller 39 determines that the external request message can be transferred and the outbound transfer message assembler 42 formulates an outbound request message with the address of the destination processing node specified in the destination address memory 41 (step 144). This message is supplied to the request message sender 37 and transmitted through the communication channel to the specified processing node (step 145). If the decision at step 143 is negative, the external request message is discarded.

If there is only one final response message in the buffer (steps 142, 143), the outbound transfer message assembler 42 formulates an outbound response message with the address of the request source 20 which is stored in the destination address memory 41 (step 144). The final response message is then supplied to the transfer message sender 43 and transmitted to the destination 21 of the response message (step 145).

If a number of final response messages are stored in the buffer 44, the operation of transfer process controller 39 at step 144 involves one of the following processes:

(a) Selecting a first arrival of the final response messages;

(b) Making a majority decision on the messages arriving in a specified time interval (one minute, for example) and selecting one of the majority-decided messages;

(c) Making a majority decision on a predetermined number of response messages and selecting one of the majority-decided messages; and (d) Calculating an average value of final response messages which arrive in a specified time interval (one minute, for example) and assembling a response message with the average value.

Figure 8:
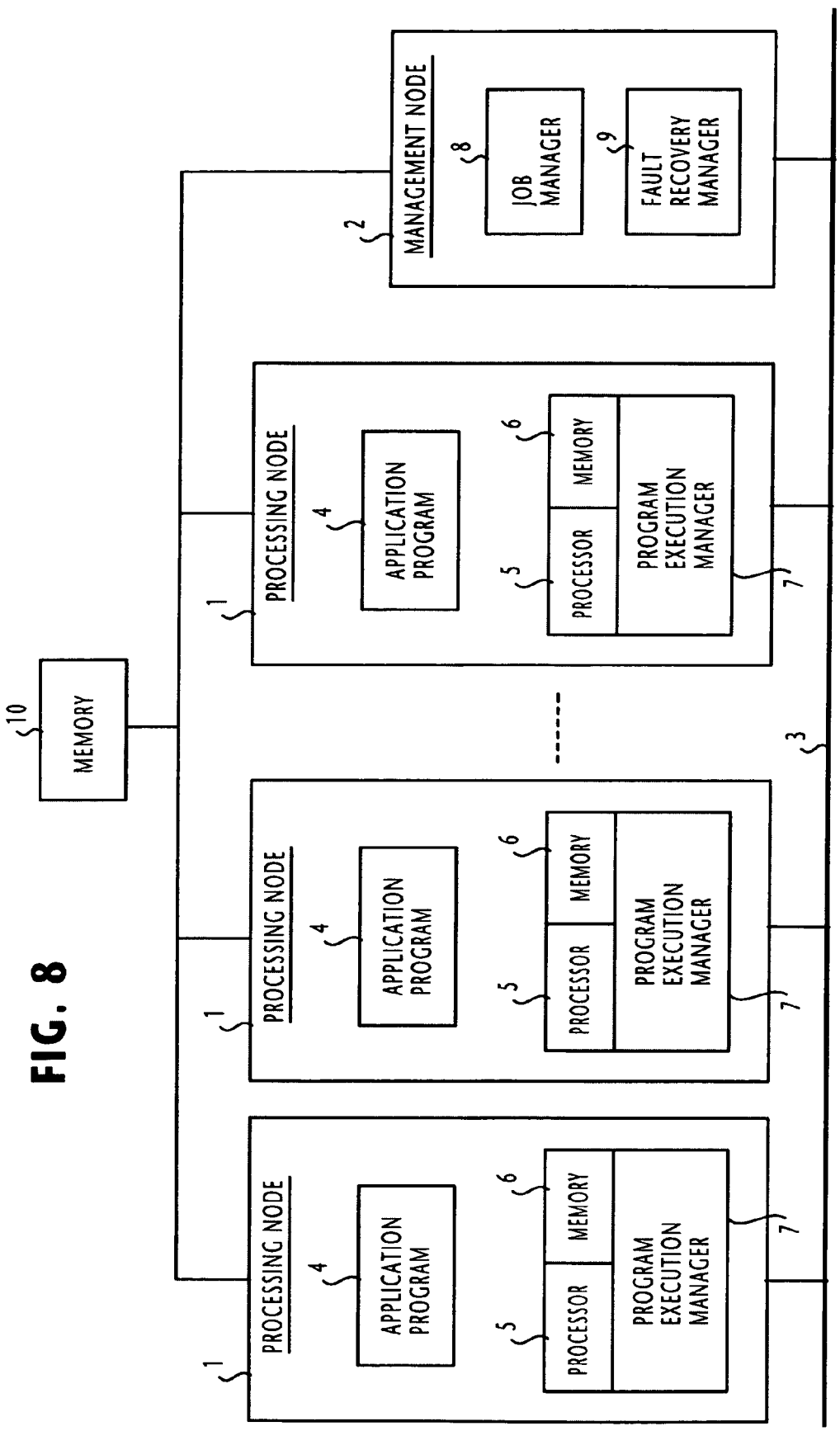
FIG. 8 is a block diagram of a computing system according to a second embodiment of the present invention.

The computing system of the previous embodiment is modified as shown in FIG. 8, in which the memory 10, which is used exclusively by the management node 2 in the previous embodiment, is shared by all the processing nodes 1 and the management node 2 so that all configuration data can be accessed from any of the nodes. The shared use of the configuration data allows the management node 2 to inform each processing node of the storage location of memory 10 where the setting data of the node is stored, instead of transmitting whole setting data via the communication channel 3. This represents a substantial saving of traffic between each processing node and the management node. The address data indicating the storage location of each processing node can be transmitted over the communication channel 3. Alternatively, the address data of all processing nodes is stored in a particular area of the memory 10, so that any processing node can read appropriate address data when it downloads its own configuration data.

In addition, when a need arises to alter the configuration of a troubled processing node (such as the priority of process or input/output devices), it is only necessary for the management node 2 to update the setting data of that processing node and the latter is instructed to download the updated data from the shared memory 10.

A further advantage of the shared memory 10 can be gained by storing the checkpointing (snapshot) data of all processing nodes 1 in the memory 10, because each processing node is able to save its own checkpointing data or read it when rebooting its program without the need to exchange the data with the management node. This results in a saving of traffic on the communication channel 3 and a saving of the overall transmission time of all checkpointing data in the system and facilitates the moving and copying of application programs. Additionally, it is possible for a processing node to alter the operating state of its application program 4 according to the running state of other processing nodes.

Figure 9:
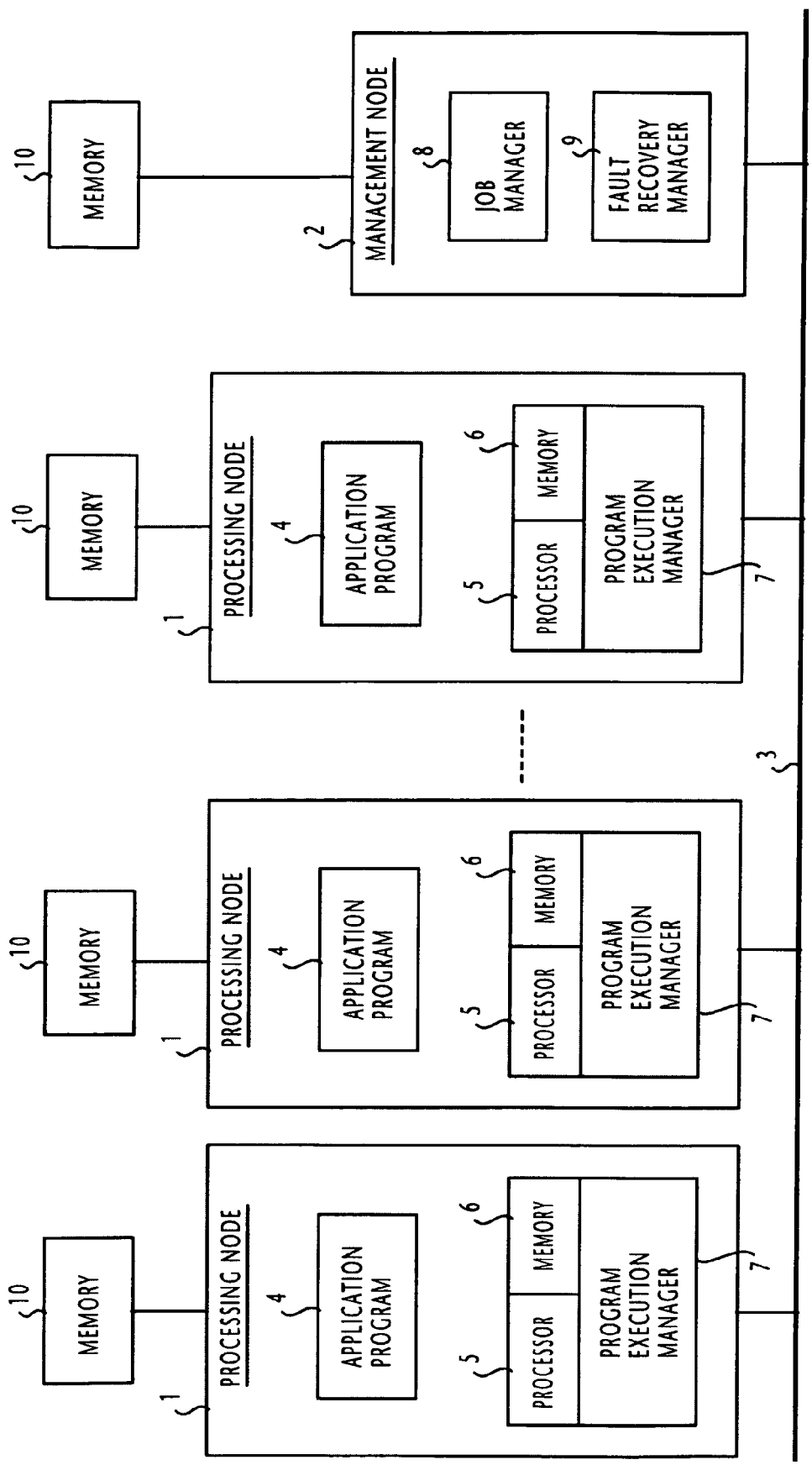
FIG. 9 is a block diagram of a computing system according to a third embodiment of the present invention.

The saving of traffic on the communication channel 3 between each processing node and the management node can also be achieved by installing the memory 10 in each of the processing nodes 1 and the management node 2 as illustrated in FIG. 9 and storing the same data in all the memories 10 and maintaining the uniformity of the distributed data by using the "mirroring" technique. Alternatively, when any of the processing nodes accesses its own memory 10, it checks to see if any update has been made. If this is the case, the processing node transmits the updated data to the other processing nodes. With this system configuration, the processing nodes and the management node are saved from exchanging configuration data.

Similar to the second embodiment, the address data indicating the storage location of each processing node in the respective memory 10 can be transmitted over the communication channel 3. Alternatively, the address data of each processing node is stored in the respective memory 10, so that each processing node can read its own address data when it sets or resets its own configuration. In addition, when a need arises to alter the configuration of a troubled processing node (such as the priority of process or input/output devices), it is only necessary for the management node 2 to update the setting data of that processing node stored in the memory 10 of the management node and the troubled processing node is instructed to download the altered data from the memory 10 of the management node to update its own configuration data.

A further advantage of the shared use of the distributed memories 10 can be gained by storing the checkpointing data of all processing nodes 1 in the respective memories 10, because each processing node is able to save its own checkpointing data or read it when rebooting its program without the need to exchange the data with the management node. Additionally, it is possible for a processing node to alter the operating state of its application program 4 according to the running state of other processing nodes. Since the same data is stored in distributed memories 10, the fault tolerance of the computing system is enhanced.

Figure 10:
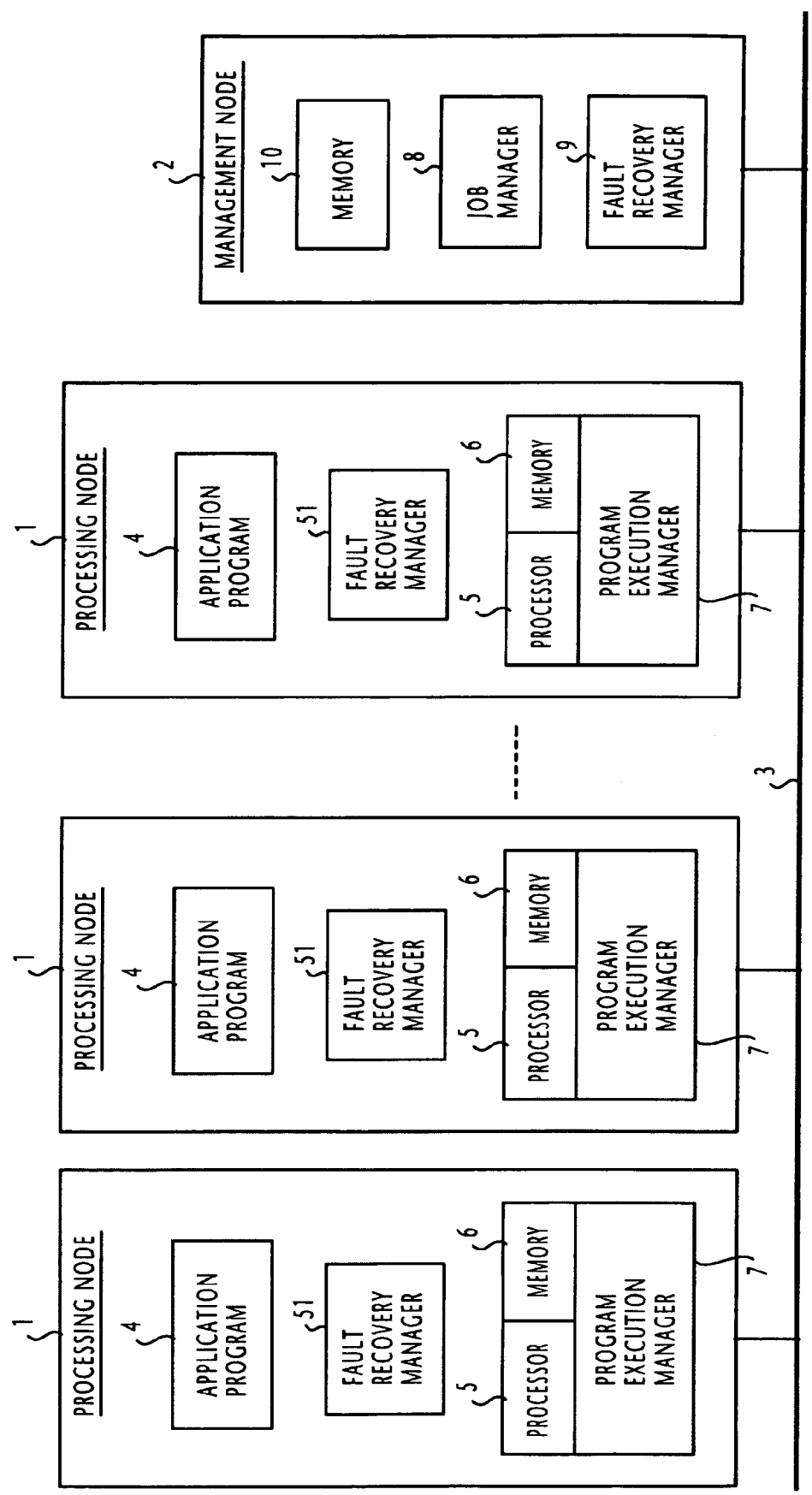
FIG. 10 is a block diagram of a computing system according to a fourth embodiment of the present invention.

In a modified embodiment shown in FIG. 10, each processing node is provided with a fault detector 51. If a failure occurs in a processing node, the fault detector 51 of this processing node communicates the detected failure to the fault detector 9 of the management node over the communication channel 3. Compared to the ping-pong method described earlier in which fault data are transmitted in opposite directions between the troubled node and the management node, a continuous signal is transmitted from each fault detector 51 to the management node 2 as a heart-beat signal. The interruption of a heart-beat signal allows the management node to recognize that a failure has occurred in a processing node. A known service processor can be advantageously used as the fault detector 51. Being provided within each processing node, the fault detector 51 is not adversely affected when the communication channel 3 fails.

Figure 11:
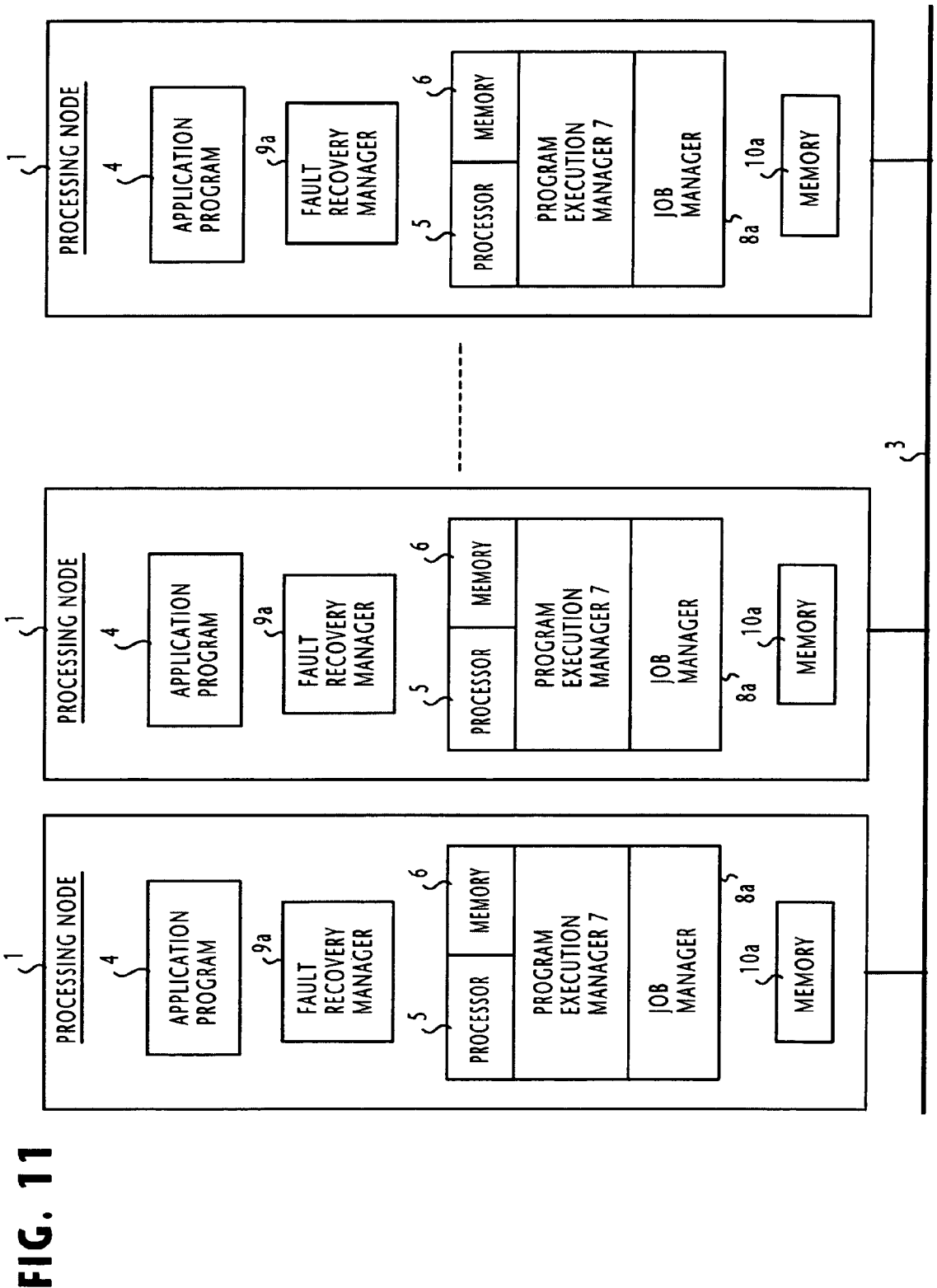
FIG. 11 is a block diagram of a computing system according to a fifth embodiment of the present invention.

A further modification of the present invention is shown in FIG. 11. In FIG. 11, the functions of job manager 8, fault detector 9 and memory 10 of management node 2 of the previous embodiments are distributed to all the processing nodes 1 as job managers 8a, fault detectors 9a and memories 10a. Mirroring technique is used by all processing nodes to maintain the uniformity of the contents of their memories. Alternatively, when any of the processing nodes updates its own memory 10a or detects an update in referenced data, it transmits the updated contents to the other processing nodes. Since the configuration data of all processing nodes are maintained in each processing node, all processing nodes are capable of performing distributed management of jobs, such as exchanging their status information with each other over the communication channel 3, updating their memory 10a, altering their own configuration and transferring a job from one processing node to another the communication channel 3.

Additionally, the operating status of the computing system as a whole is monitored by all fault detectors 9a. When the fault detector 9a of a processing node detects a failure in the system, an alarm is sent via the program execution manager 7 of that node to the fault detector 9a of the other nodes. The same failure data and the same recovery data are shared by all the processing nodes. This prevents the fault detectors 9a from simultaneously issuing conflicting commands in response to a single-source failure. Due to the distributed management functions, if one of the processing nodes fails to operate properly, the other nodes continue operating, and as a result, the system as a whole continuously performs its fault monitoring and management functions. Therefore, high fault tolerance is ensured.

What is claimed is:

1. A fault tolerant computing system comprising:
a plurality of processing nodes interconnected by a communication channel, each of said processing nodes having an identical application program;
control means for respectively setting said processing nodes in uniquely different configurations and operating said processing nodes in parallel to execute the application programs in environments corresponding to said uniquely different configurations; and
distributing means for distributing request messages respectively to said processing nodes, so that said request messages are individually processed by said application programs to produce a plurality of response messages, wherein the configurations of said processing nodes are sufficiently different from each other that software faults are not simultaneously activated by said processing nodes, wherein each of said configurations comprises hardware configuration, software configuration, external device configuration and program startup configuration, and wherein said hardware configuration data includes parameters indicating main memory size, virtual memory size, memory access timing, processor operating speed, bus transmission speed, bus width, number of processors, read cache memory size, write cache memory size, cache's valid/invalid status, and types of processors and memories, and wherein each of said processing nodes differs from every other processing nodes in one of said parameters of hardware configuration data.

2. The fault tolerant computing system of claim 1, wherein said external device configuration data includes parameters indicating types of external devices, display unit, input/output device, and communication interface, and wherein each of said processing nodes differs from every other processing nodes in one of said parameters of external device configuration data.

3. The fault tolerant computing system of claim 1, wherein said distributing means includes a memory for storing distribution data, wherein the distributing means distributes said request messages to said processing nodes according to the stored distribution data, further comprising fault recovery means for monitoring said processing nodes and updating the stored distribution data if a failure is detected in said processing nodes.

4. The fault tolerant computing system of claim 3, wherein said fault recovery means is arranged to alter the configuration of one of said processing nodes when a failure is detected in said one processing node and restart said processing nodes.

5. The fault tolerant computing system of claim 3, wherein said fault recovery means is arranged to alter the program startup configuration of one of said processing nodes when a failure is detected in said one processing node and restart said processing nodes.

6. The fault tolerant computing system of claim 3, wherein said fault recovery means is arranged to alter checkpointing data of each of said processing nodes when a failure is detected so that the checkpointing data of each processing node differs from the checkpointing data of every other processing nodes.

7. The fault tolerant computing system of claim 1, wherein said control means and said distributing means are provided in a management node connected to said processing nodes via said communication channel.

8. The fault tolerant computing system of claim 1, wherein each of said processing nodes comprises:

a memory for storing a plurality of uniquely different configuration data corresponding to said processing nodes;

fault recovery means for monitoring the processing node and updating corresponding one of the stored configuration data if a failure is detected in the processing node;

means for exchanging update information with every other processing nodes whenever there is a change in the stored configuration data.

9. The fault tolerant computing system of claim 1, wherein each of said processing nodes is one of a real machine.

10. The fault tolerant computing system of claim 1, wherein each of said processing nodes is one of a virtual machine.

11. A fault tolerant computing system comprising:

a plurality of processing nodes interconnected by a communication channel, each of said processing nodes having an identical application program;

control means for respectively setting said processing nodes in uniquely different configurations and operating said processing nodes in parallel to execute the application programs in environments corresponding to said uniquely different configurations; and distributing means for distributing request messages respectively to said processing nodes, so that said request messages are individually processed by said application programs to produce a plurality of response messages, wherein the configurations of said processing nodes are sufficiently different from each other that software faults are not simultaneously activated by said processing nodes, wherein each of said configurations comprises hardware configuration, software configuration, external device configuration and program startup configuration, and wherein said software configuration data includes parameters indicating operating system, basic software, various device drivers, and various library versions, and wherein each of said processing nodes differs from every other processing nodes in one of said parameters of software configuration data.

12. A fault tolerant computing system comprising:

a plurality of processing nodes interconnected by a communication channel, each of said processing nodes having an identical application program;

control means for respectively setting said processing nodes in uniquely different configurations and operating said processing nodes in parallel to execute the application programs in environments corresponding to said uniquely different configurations; and distributing means for distributing request messages respectively to said processing nodes, so that said request messages are individually processed by said application programs to produce a plurality of response messages, wherein the configurations of said processing nodes are sufficiently different from each other that software faults are not simultaneously activated by said processing nodes, wherein each of said configurations comprises hardware configuration, software configuration, external device configuration and program startup configuration, and wherein said program startup configuration data includes parameters indicating (a) interruption and reboot of an application program by suspending the CPU while holding contents of main memory, (b) interruption and reboot of an application program by saving contents of the main and virtual memories on a hard disk, suspending operating system and restoring the saved memory contents when operating system is restarted, (c) interruption and reboot of an application program by suspending and restarting operating system, (d) interruption and reboot of an application program by forcibly interrupting and restarting the program and operating system, (e) restarting of an application program and operating system after reinstalling the program and operating system, and (f) restarting an application program and operating system after performing a clear install of the program and operating system, and wherein each of said processing nodes differs from every other processing nodes in one of said parameters of program startup configuration data.

13. A fault tolerant computing system comprising:
a plurality of processing nodes interconnected by a communication channel, each of said processing nodes having an identical application program;
control means for respectively setting said processing nodes in uniquely different configurations and operating said processing nodes in parallel to execute the application programs in environments corresponding to said uniquely different configurations; and
distributing means for distributing request messages respectively to said processing nodes, so that said request messages are individually processed by said application programs to produce a plurality of response messages,
wherein the configurations of said processing nodes are sufficiently different from each other that software faults are not simultaneously activated by said processing nodes, and
wherein said control means includes a memory for storing a plurality of uniquely different configuration data corresponding to said processing nodes, and wherein said processing nodes are respectively set in said configurations according to the stored uniquely different configuration data.

14. The fault tolerant computing system of claim 13, further comprising a commonly-shared memory for storing a plurality of uniquely different configuration data corresponding to said processing nodes, and wherein said processing nodes are accessible to said memory for setting said configurations according to the stored uniquely different configuration data.

15. A fault tolerant computing system comprising:
a plurality of processing nodes interconnected by a communication channel, each of said processing nodes having an identical application program;
control means for respectively setting said processing nodes in uniquely different configurations and operating said processing nodes in parallel to execute the application programs in environments corresponding to said uniquely different configurations;
distributing means for distributing request messages respectively to said processing nodes, so that said request messages are individually processed by said application programs to produce a plurality of response messages; and
decision means for receiving said response messages from said processing nodes and selecting one of the response messages,
wherein the configurations of said processing nodes are sufficiently different from each other that software faults are not simultaneously activated by said processing nodes.

16. The fault tolerant computing system of claim 15, wherein said decision means selects one of the response messages on a first-served-first-arrived basis.

17. The fault tolerant computing system of claim 15, wherein said decision means makes a majority decision on a plurality of said response messages which arrive in a specified time interval and selects one of the majority-decided response messages.

18. The fault tolerant computing system of claim 15, wherein said decision means makes a majority decision on a predetermined number of said response messages and selects one of the majority-decided response messages.

19. The fault tolerant computing system of claim 15, wherein said decision means calculates an average value from said plurality of response messages and formulates a response message with said average value.

20. The fault tolerant computing system of claim 15, wherein said decision means receives an external request message from an external source via said communication channel and sends the received message to one of said processing nodes.

21. The fault tolerant computing system of claim 15, wherein said decision means comprises:
a memory for storing distribution data;
means for updating the distribution data according to operating status of said processing nodes; and
means for supplying said external request message to said one of the processing nodes according to the distribution data.

22. A fault tolerant computing system comprising:
a plurality of processing nodes interconnected by a communication channel, each of said processing nodes having an identical application;
control means for selecting said processing nodes which are respectively set in uniquely different configurations and operating the selected processing nodes in parallel to execute the application programs in diversified environments corresponding to said uniquely different configurations; and
distributing means for distributing request messages respectively to the selected processing nodes, so that said request messages are individually processed by the application programs of the selected processing nodes to produce a plurality of response messages,
wherein the configurations of said selected processing nodes are sufficiently different from each other that software faults are not simultaneously activated by said selected processing nodes,
wherein each of said node configuration data comprises hardware configuration data, software configuration data, external device configuration data and program startup configuration data, and
wherein said hardware configuration data includes parameters indicating main memory size, virtual memory size, memory access timing, processor operating speed, bus transmission speed, bus width, number of processors, read cache memory size, write cache memory size, cache's valid/invalid status, and types of processors and memories, and wherein each of said processing nodes differs from every other processing nodes in one of said parameters of hardware configuration data.

23. The fault tolerant computing system of claim 22, wherein said external device configuration data includes parameters indicating types of external devices, display unit, input/output device, and communication interface, and wherein each of said processing nodes differs from every other processing nodes in one of said parameters of external device configuration data.

24. The fault tolerant computing system of claim 22, wherein said distributing means includes a memory for storing distribution data, wherein the distributing means distributes said request messages to the selected processing nodes according to the stored distribution data, further comprising fault recovery means for monitoring the selected processing nodes and updating the stored distribution data if a failure is detected in the selected processing nodes.

25. The fault tolerant computing system of claim 22, wherein each of said processing nodes is a real machine.

26. The fault tolerant computing system of claim 22, wherein each of said processing nodes is a virtual machine.

27. A fault tolerant computing system comprising:

a plurality of processing nodes interconnected by a communication channel, each of said processing nodes having an identical application;

control means for selecting said processing nodes which are respectively set in uniquely different configurations and operating the selected processing nodes in parallel to execute the application programs in diversified environments corresponding to said uniquely different configurations; and distributing means for distributing request messages respectively to the selected processing nodes, so that said request messages are individually processed by the application programs of the selected processing nodes to produce a plurality of response messages, wherein the configurations of said selected processing nodes are sufficiently different from each other that software faults are not simultaneously activated by said selected processing nodes, wherein each of said node configuration data comprises hardware configuration data, software configuration data, external device configuration data and program startup configuration data, and wherein said software configuration data includes parameters indicating operating system, basic software, various device drivers, and various library versions, and wherein each of said processing nodes differs from every other processing nodes in one of said parameters of software configuration data.

28. A fault tolerant computing system comprising:

a plurality of processing nodes interconnected by a communication channel, each of said processing nodes having an identical application;

control means for selecting said processing nodes which are respectively set in uniquely different configurations and operating the selected processing nodes in parallel to execute the application programs in diversified environments corresponding to said uniquely different configurations; and distributing means for distributing request messages respectively to the selected processing nodes, so that said request messages are individually processed by the application programs of the selected processing nodes to produce a plurality of response messages, wherein the configurations of said selected processing nodes are sufficiently different from each other that software faults are not simultaneously activated by said selected processing nodes, wherein each of said node configuration data comprises hardware configuration data, software configuration data, external device configuration data and program startup configuration data, and wherein said program startup configuration data includes parameters indicating (a) interruption and reboot of an application program by suspending the CPU while holding contents of main memory, (b) interruption and reboot of an application program by saving contents of the main and virtual memories on a hard disk, suspending operating system and restoring the saved memory contents when operating system is restarted, (c) interruption and reboot of an application program by suspending and restarting operating system, (d) interruption and reboot of an application program by forcibly interrupting and restarting the program and operating system, (e) restarting of an application program and operating system after reinstalling the program and operating system, and (f) restarting an application program and operating system after performing a clear install of the program and operating system, and wherein each of said processing nodes differs from every other processing nodes in one of said parameters of program startup configuration data.

29. A fault tolerant computing system comprising:

a plurality of processing nodes interconnected by a communication channel, each of said processing nodes having an identical application;

control means for selecting said processing nodes which are respectively set in uniquely different configurations and operating the selected processing nodes in parallel to execute the application programs in diversified environments corresponding to said uniquely different configurations; and distributing means for distributing request messages respectively to the selected processing nodes, so that said request messages are individually processed by the application programs of the selected processing nodes to produce a plurality of response messages, wherein the configurations of said selected processing nodes are sufficiently different from each other that software faults are not simultaneously activated by said selected processing nodes, wherein said distributing means includes a memory for storing distribution data, wherein the distributing means distributes said request messages to the selected processing nodes according to the stored distribution data, further comprising fault recovery means for monitoring the selected processing nodes and updating the stored distribution data if a failure is detected in the selected processing nodes, and wherein said fault recovery means is arranged to alter the configuration of one of the selected processing nodes when a failure is detected in said one processing node and restart the selected processing nodes.

30. A fault tolerant computing system comprising:

a plurality of processing nodes interconnected by a communication channel, each of said processing nodes having an identical application;

control means for selecting said processing nodes which are respectively set in uniquely different configurations and operating the selected processing nodes in parallel to execute the application programs in diversified environments corresponding to said uniquely different configurations; and distributing means for distributing request messages respectively to the selected processing nodes, so that said request messages are individually processed by the application programs of the selected processing nodes to produce a plurality of response messages, wherein the configurations of said selected processing nodes are sufficiently different from each other that software faults are not simultaneously activated by said selected processing nodes, wherein said distributing means includes a memory for storing distribution data, wherein the distributing means distributes said request messages to the selected processing nodes according to the stored distribution data, further comprising fault recovery means for monitoring the selected processing nodes and updating the stored distribution data if a failure is detected in the selected processing nodes, and wherein said fault recovery means is arranged to alter the program startup configuration of one of the selected processing nodes when a failure is detected in said one processing node and restart the selected processing nodes.

31. A fault tolerant computing system comprising:
a plurality of processing nodes interconnected by a communication channel, each of said processing nodes having an identical application;
control means for selecting said processing nodes which are respectively set in uniquely different configurations and operating the selected processing nodes in parallel to execute the application programs in diversified environments corresponding to said uniquely different configurations; and
distributing means for distributing request messages respectively to the selected processing nodes, so that said request messages are individually processed by the application programs of the selected processing nodes to produce a plurality of response messages,
wherein the configurations of said selected processing nodes are sufficiently different from each other that software faults are not simultaneously activated by said selected processing nodes,
wherein said distributing means includes a memory for storing distribution data, wherein the distributing means distributes said request messages to the selected processing nodes according to the stored distribution data, further comprising fault recovery means for monitoring the selected processing nodes and updating the stored distribution data if a failure is detected in the selected processing nodes, and
wherein said fault recovery means is arranged to alter checkpointing data of each of the selected processing nodes when a failure is detected so that the checkpointing data of each of the selected processing nodes differs from the checkpointing data of every other selected processing nodes.

32. A fault tolerant computing system comprising:
a plurality of processing nodes interconnected by a communication channel, each of said processing nodes having an identical application;
control means for selecting said processing nodes which are respectively set in uniquely different configurations and operating the selected processing nodes in parallel to execute the application programs in diversified environments corresponding to said uniquely different configurations;
distributing means for distributing request messages respectively to the selected processing nodes, so that said request messages are individually processed by the application programs of the selected processing nodes to produce a plurality of response messages; and
decision means for receiving said response messages from said processing nodes and selecting one of the response messages,
wherein the configurations of said selected processing nodes are sufficiently different from each other that software faults are not simultaneously activated by said selected processing nodes.

33. The fault tolerant computing system of claim 32, wherein said decision means selects one of the response messages on a first-served-first-arrived basis.

34. The fault tolerant computing system of claim 32, wherein said decision means makes a majority decision on a plurality of said response messages which arrive in a specified time interval and selects one of the majority-decided response messages.

35. The fault tolerant computing system of claim 32, wherein said decision means makes a majority decision on a predetermined number of said response messages and selects one of the majority-decided response messages.

36. The fault tolerant computing system of claim 32, wherein said decision means calculates an average value from said plurality of response messages and formulates a response message with said average value.

37. The fault tolerant computing system of claim 32, wherein said decision means receives an external request message from an external source via said communication channel and sends the received message to one of said processing nodes.

38. The fault tolerant computing system of claim 32, wherein said decision means comprises:
a memory for storing distribution data;
means for updating the distribution data according to operating status of said processing nodes; and
means for supplying said external request message to said one of the processing nodes according to the distribution data.

39. A fault tolerant computing system comprising:
a plurality of processing nodes interconnected by a communication channel, each of said processing nodes having an identical application program;
a control unit configured to respectively set said processing nodes in uniquely different configurations and operating said processing nodes in parallel to execute the application programs in environments corresponding to said uniquely different configurations; and
a distributing unit configured to distribute request messages respectively to said processing nodes, so that said request messages are individually processed by said application programs to produce a plurality of response messages,
wherein the configurations of said processing nodes are sufficiently different from each other that software faults are not simultaneously activated by said processing nodes,
wherein said distributing unit includes a memory for storing distribution data, wherein the distributing unit distributes said request messages to said processing nodes according to the stored distribution data, further comprising a fault recovery unit configured to monitor said processing nodes and update the stored distribution data if a failure is detected in said processing nodes, and
wherein said fault recovery unit is arranged to either: a) alter the program startup configuration of one of said processing nodes when a failure is detected in said one processing node and restart said processing nodes, b) alter the program startup configuration of one of said processing nodes when a failure is detected in said one processing node and restart said processing nodes, or c) alter checkpointing data of each of said processing nodes when a failure is detected so that the checkpointing data of each processing node differs from the checkpointing data of every other processing nodes.

* * * * *